US012791078B2

(12) United States Patent
Yabe et al.

(10) Patent No.: US 12,791,078 B2

(45) Date of Patent: Nov. 10, 2026

(54) SHOCK ABSORBER AND VALVE APPARATUS

(71) Applicant: Hitachi Astemo, Ltd., Hitachinaka (JP)

(72) Inventors: Chihiro Yabe, Hitachinaka (JP); Osamu Yuno, Hitachinaka (JP); Takao Nakadate, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 453 days.

(21) Appl. No.: 18/274,637

(22) PCT Filed: Mar. 4, 2022

(86) PCT No.: PCT/JP2022/009338

§ 371 (c)(1),
(2) Date: Jul. 27, 2023

(87) PCT Pub. No.: WO2022/209576

PCT Pub. Date: Oct. 6, 2022

(65) Prior Publication Data

US 2024/0093752 A1 Mar. 21, 2024

(30) Foreign Application Priority Data

Mar. 29, 2021 (JP) ................................ 2021-055341

(51) Int. Cl.

*F16F 9/34* (2006.01)
*F16F 9/18* (2006.01)
(Continued)

(52) U.S. Cl.

CPC .................................... *F16F 9/348* (2013.01)

(58) Field of Classification Search

None
See application file for complete search history.

(56) References Cited

U.S. PATENT DOCUMENTS 6,655,512 B2 * 12/2003 Moradmand ........... F16F 9/348 188/282.5
6,668,986 B2 * 12/2003 Moradmand ........... F16F 9/466 188/266.2
(Continued)

FOREIGN PATENT DOCUMENTS

JP 5-79525 3/1993
JP 2013-170663 9/2013
(Continued)

OTHER PUBLICATIONS

English translation WO 2020149224 A1 (Year: 2020).*
(Continued)

*Primary Examiner* — Robert A. Siconolfi
*Assistant Examiner* — James K Hsiao
(74) *Attorney, Agent, or Firm* — Wenderoth, Lind & Ponack, L.L.P.

(57) ABSTRACT

One aspect of the present invention is configured in such a manner that a main valve (a valve member) is in abutment with only a ridge portion (a second protrusion portion) on the inner peripheral side of a seat portion (a first seat portion) in a state of being mounted on a piston. This configuration can reduce the radial contact width between the main valve and the seat portion, and contribute to preventing or reducing variations in the valve-opening point and the damping force by managing the radial dimension of the ridge portion on the inner peripheral side of the seat portion to allow the contact diameter between the main valve and the seat portion to be kept constant.

7 Claims, 3 Drawing Sheets

(51) Int. Cl.
*F16F 9/348* (2006.01)
*F16K 15/14* (2006.01)

(56) References Cited

U.S. PATENT DOCUMENTS

| | | | | | |
|---|---|---|---|---|---|
| 8,794,407 | B2 * | 8/2014 | Vanbrabant | F16F 9/34 188/315 |
| 9,631,695 | B2 * | 4/2017 | De Kock | F16F 9/44 |
| 11,261,932 | B2 * | 3/2022 | Kadokura | F16F 9/516 |
| 11,598,389 | B2 * | 3/2023 | Kim | F16F 9/3487 |
| 11,655,875 | B2 * | 5/2023 | Kobayashi | F16K 15/148 188/281 |
| 2016/0223047 | A1 * | 8/2016 | Kim | F16F 9/5165 |
| 2016/0333959 | A1 * | 11/2016 | Kim | F16F 9/3482 |
| 2017/0080767 | A1 * | 3/2017 | Yamashita | F16F 9/504 |
| 2017/0114857 | A1 * | 4/2017 | Kim | F16F 9/44 |
| 2020/0003272 | A1 * | 1/2020 | Yamashita | F16F 9/512 |
| 2020/0032871 | A1 * | 1/2020 | Yamashita | F16F 9/3221 |
| 2020/0032872 | A1 * | 1/2020 | Kadokura | F16F 9/5123 |
| 2021/0025471 | A1 * | 1/2021 | Kobayashi | F16F 9/185 |
| 2022/0099153 | A1 * | 3/2022 | Yuno | F16F 9/348 |
| 2023/0037408 | A1 * | 2/2023 | Muzvidziwa | F16F 9/19 |

FOREIGN PATENT DOCUMENTS

| | | | | |
|---|---|---|---|---|
| WO | 2020/149224 | | 7/2020 | |
| WO | WO-2020149224 A1 | * | 7/2020 | F16F 9/465 |

OTHER PUBLICATIONS

International Search Report issued May 17, 2022 in International Application No. PCT/JP2022/009338, with English translation.
Written Opinion of the International Searching Authority issued May 17, 2022 in International Application No. PCT/JP2022/009338, with English translation.
Office Action issued Dec. 16, 2024 in corresponding Korean Patent Application No. 10-2023-7028830, with machine translation.

* cited by examiner

SHOCK ABSORBER AND VALVE APPARATUS

TECHNICAL FIELD

The present invention relates to a shock absorber that generates a variable damping force by controlling a flow of hydraulic fluid caused in reaction to a stroke of a piston rod, and a valve apparatus used in this shock absorber.

BACKGROUND ART

PTL 1 discloses a shock absorber in which a leaf valve 4 is configured to have no local deformation from a boss portion 12 to a seat portion 13 due to formation of a surface between an inner edge a of the boss portion 12 and an outer edge b of the seat portion 13 as the same curved surface gradually increasing in height from the inner side toward the outer side (hereinafter referred to as a "conventional shock absorber"). According to the conventional shock absorber, an initial load applied to the end portion of the leaf valve 4 on the outer peripheral side can be prevented from varying, and a variation in the damping force can be prevented or reduced.

CITATION LIST

Patent Literature

PTL 1: Japanese Patent Application Public Disclosure No. 2013-170663

SUMMARY OF INVENTION

Technical Problem

However, in the conventional shock absorber, the leaf valve 4 is seated on the entire surface of the seat portion 13 in the width direction (the radial direction of the boss portion), and therefore a variation occurs in the contact width between the seat portion 13 and the leaf valve 4 if a step H of the seat portion 13 is small. The occurrence of a variation in this contact width may make the pressure-receiving area of the leaf valve 4 variable, thereby leading to variations in the valve-opening point and the damping force.

One of the objects of the present invention is to provide a shock absorber and a valve apparatus capable of preventing or reducing a variation in a damping force.

Solution to Problem

According to an aspect of the present invention, a shock absorber includes a cylinder sealingly containing hydraulic fluid therein, a piston partitioning an inside of the cylinder into a first chamber and a second chamber, and a valve member configured to open and close a passage provided in the piston. An annular first seat portion protruding from the piston is formed on the piston on an outer peripheral side with respect to an opening of the passage. An annular first protrusion portion and an annular second protrusion portion are formed on the first seat portion. The second protrusion portion extends in a direction away from the piston further than the first protrusion portion. The valve member is placed in abutment with only the second protrusion portion in a state of being mounted on the piston.

According to an aspect of the present invention, a valve apparatus includes a piston partitioning an inside of a cylinder into a first chamber and a second chamber, and a valve member configured to open and close a passage provided in the piston. An annular first seat portion protruding from the piston is formed on the piston on an outer peripheral side with respect to an opening of the passage. An annular first protrusion portion and an annular second protrusion portion are formed on the first seat portion. The second protrusion portion extends in a direction away from the piston further than the first protrusion portion. The valve member is placed in abutment with only the second protrusion portion in a state of being mounted on the piston.

According to one aspect of the present invention, a variation in the damping force in the shock absorber and the valve apparatus can be prevented or reduced.

DESCRIPTION OF EMBODIMENTS

A first embodiment of the present invention will be described with reference to the attached drawings.

Figure 1:
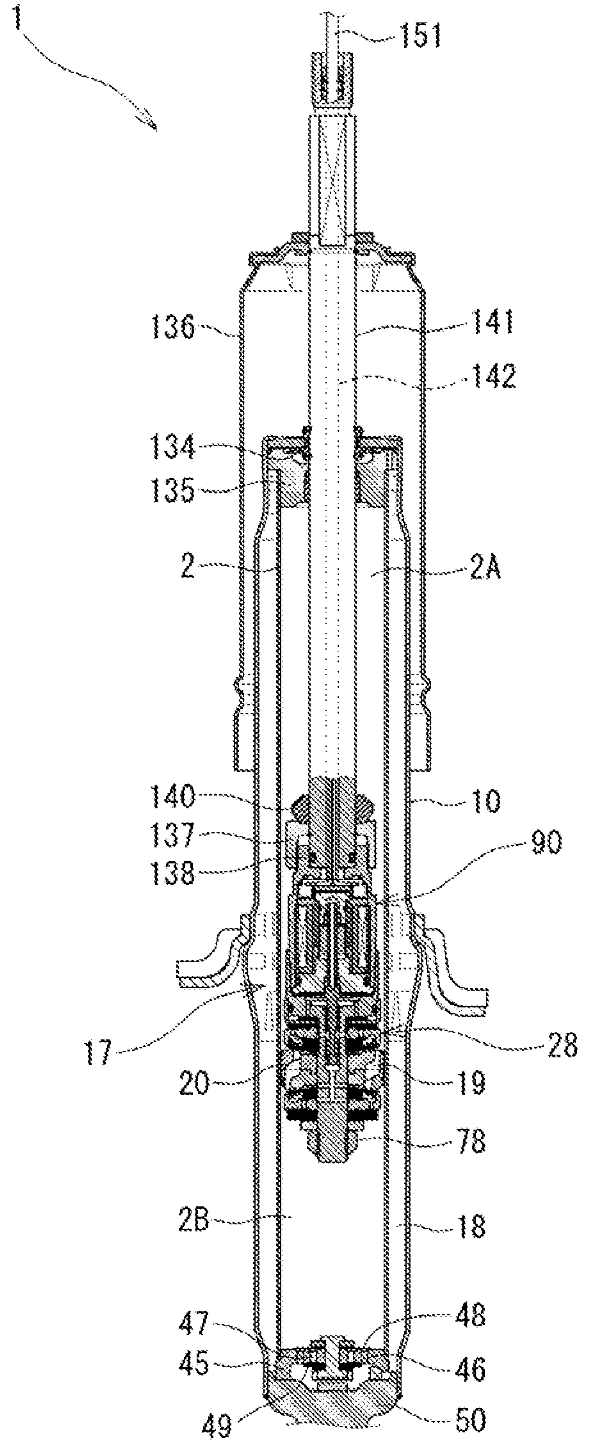
FIG. 1 is a cross-sectional view of a shock absorber according to a first embodiment taken along an axial plane.

For convenience, the vertical direction in FIG. 1 will be referred to as a "vertical direction" herein simply. FIG. 1 illustrates a so-called a built-in piston-type damping force adjustable shock absorber 1 (a damping mechanism) in which a damping force variable mechanism 17 is built in a cylinder 2.

As illustrated in FIG. 1, the shock absorber 1 has a twin-tube structure including an outer tube 10 provided outside the cylinder 2. The shock absorber 1 includes a piston 3, a piston rod 141, and the damping force variable mechanism 17. The piston 3 is slidably fitted in the cylinder 2, and partitions the inside of the cylinder 2 into two chambers, a cylinder upper chamber 2A (a first chamber) and a cylinder lower chamber 2B (a second chamber). The piston rod 141 has one end coupled with the piston 3, and an opposite end side (the upper side in FIG. 1) extending out of the cylinder 2. The damping force variable mechanism 17 is fixed to the piston rod 141, and establishes communication between the cylinder upper chamber 2A and the cylinder lower chamber 2B so as to permit a mutual flow therethrough and generates a variable damping force characteristic by controlling a flow of hydraulic oil (hydraulic fluid) according to a movement of the piston 3.

A reservoir 18 is formed between the cylinder 2 and the outer tube 10. The piston 3 includes an extension-side passage 19 and a compression-side passage 20. The upper end side of the extension-side passage 19 is opened to the cylinder upper chamber 2A. The lower end side of the compression-side passage 20 is opened to the cylinder lower chamber 2B. A base valve 45 is provided at the lower end portion of the cylinder 2. The base valve 45 separates the cylinder lower chamber 28 and the reservoir 18 from each other. Passages 46 and 47 are provided in the base valve 45. The passages 46 and 47 establish communication between the cylinder lower chamber 2B and the reservoir 18.

A check valve 48 is provided on the passage 46. The check valve 48 permits only a flow of the oil fluid (the hydraulic fluid) from the reservoir 4 side toward the cylinder lower chamber 23 side. On the other hand, a disk valve 49 is provided on the passage 47. The disk valve 49 is opened by an increase in the pressure of the oil fluid on the cylinder lower chamber 2B side to a predetermined pressure, and releases the pressure (the oil fluid) on the cylinder lower chamber 28 side toward the reservoir 18 side. Oil fluid is sealingly contained in the cylinder 2 and oil fluid and gas are sealingly contained in the reservoir 18 as the hydraulic fluid. Further, a bottom cap 50 is joined to the lower end of the outer tube 10.

Figure 2:
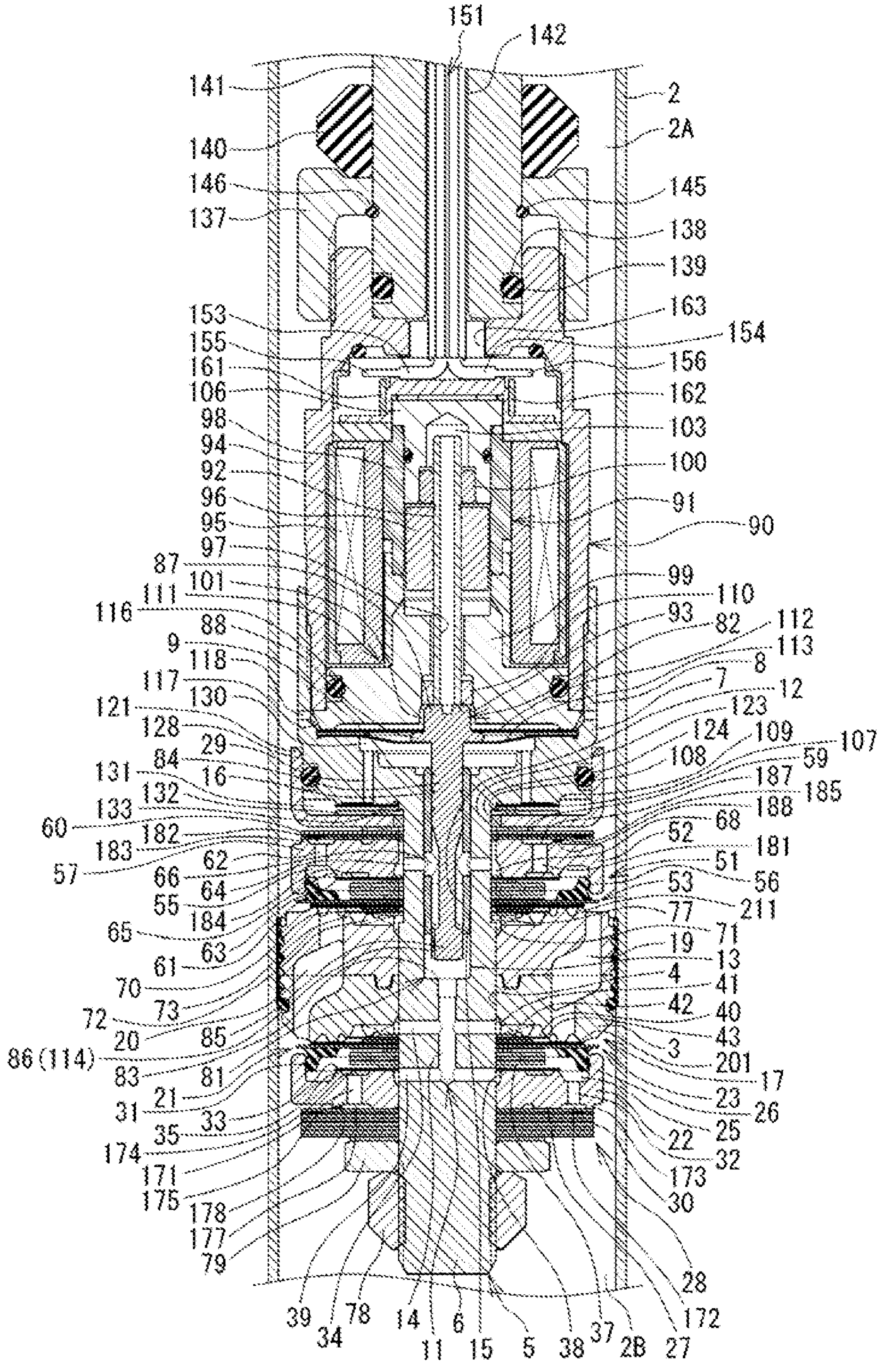
FIG. 2 is an enlarged view of a damping force adjustment mechanism illustrated in FIG. 1.

The damping force variable mechanism 17 includes a valve mechanism portion 28 and a solenoid 90. As illustrated in FIG. 2, the valve mechanism portion 28 includes a piston bolt 5, an extension-side valve mechanism 21, and a compression-side valve mechanism 51. A shaft portion 6 of the piston bolt 5 is inserted through an axial hole 4 of the piston 3. The extension-side valve mechanism 21 controls a flow of the hydraulic fluid in the extension-side passage 19. The compression-side valve mechanism 51 controls a flow of the hydraulic fluid in the compression-side passage 20.

The extension-side valve mechanism 21 includes a bottomed cylindrical extension-side pilot case 22 attached to the shaft portion 6 of the piston bolt 5. The extension-side pilot case 22 includes a cylindrical portion 26 opened on the piston 3 side, and a bottom portion 27. An extension-side main valve 23 (a valve member) is disposed on the piston 3 side of the extension-side pilot case 22. Further, an extension-side back-pressure chamber 25 is formed on an opposite piston side (the "lower side" in FIG. 2) of the extension-side main valve 23 and between the extension-side main valve 23 and the extension-side pilot case 22.

The extension-side valve mechanism 21 includes an annular seat portion 201 (a first seat portion). The seat portion 201 is formed on the outer peripheral side of the lower end surface of the piston 3, and the extension-side main valve 23 is in abutment with the seat portion 201 in a seatable and separable manner. The seat portion 201 is formed on the outer peripheral side with respect to the opening of the extension-side passage 19. The extension-side back-pressure chamber 25 is formed between the extension-side pilot case 22 and the back surface of the extension-side main valve 23. A pressure in the extension-side back-pressure chamber 25 is applied to the extension-side main valve 23 in a valve-closing direction. An annular packing 31 made of an elastic member is baked to the extension-side main valve 23. The extension-side main valve 23 is a packing valve in which the packing 31 is in contact with the inner peripheral surface of the cylindrical portion 26 of the extension-side pilot case 22 along the entire circumference thereof.

The extension-side back-pressure chamber 25 is in communication with the cylinder lower chamber 2B via passages 32 formed in the bottom portion 27 of the extension-side pilot case 22 and a sub valve 30. The sub valve 30 is opened when the pressure in the extension-side back-pressure chamber 25 reaches a predetermined pressure, and applies a resistance force to a flow of the hydraulic fluid directed from the extension-side back-pressure chamber 25 to the cylinder lower chamber 2B.

The extension-side back-pressure chamber 25 is in communication with first pressure-receiving chambers 172 formed between the extension-side pilot case 22 and the sub valve 30 via the passages 32. The first pressure-receiving chambers 172 are each defined in a fan-like form by a plurality of annular first seat portions 173 provided on the lower end surface of the extension-side pilot case 22 (the surface thereof opposite from the extension-side main valve 23 side). The passages 32 are opened on the inner sides with respect to the plurality of first seat portions 173, respectively.

A back-pressure introduction passage 171 is provided in the extension-side pilot case 22. In the back-pressure introduction passage 171, a flow of the hydraulic fluid from the cylinder lower chamber 2B to the extension-side back-pressure chamber 25 is generated due to a movement of the piston 3 in a compression direction. An annular seat portion 35 is provided on the upper end surface of the extension-side pilot case 22 (the surface thereof on the extension-side main valve 23 side). The seat portion 35 defines an annular pressure-receiving chamber 174 provided on the outer periphery of the inner peripheral portion of the bottom portion 27.

A second pressure-receiving chamber 177 isolated from the first pressure-receiving chambers 172 is provided on the lower end surface of the extension-side pilot case 22. The back-pressure introduction passage 171 is opened to the second pressure-receiving chamber 177. The second pressure-receiving chamber 177 is defined by a second seat portion 178. The second seat portion 178 extends in a circular arc form between a pair of adjacent first pressure-receiving chambers 172. A first orifice 175 is provided on the second seat portion 178. The first orifice 175 establishes communication between the second pressure-receiving chamber 177 and the cylinder lower chamber 2B.

Due to this configuration, an extension-side communication passage (a communication passage) establishing communication between the cylinder lower chamber 2B and the extension-side back-pressure chamber 25 is formed in the extension-side valve mechanism 21. Through the extension-side communication passage, the hydraulic fluid in the cylinder lower chamber 2B is introduced into the extension-side back-pressure chamber 25 via the first orifice 175, the second pressure-receiving chamber 177, the back-pressure introduction passage 171, the pressure-receiving chamber 174, and a check valve 33 according to the movement of the piston 3 in the compression direction.

On the other hand, the compression-side valve mechanism 51 includes a bottomed cylindrical compression-side pilot case 52 attached to the shaft portion 6 of the piston bolt 5. The compression-side pilot case 52 includes a cylindrical portion 56 opened on the piston 3 side, and a bottom portion 57. A compression-side main valve 53 (the valve member) is disposed on the piston 3 side of the compression-side pilot case 52. Further, a compression-side back-pressure chamber 55 is formed on an opposite piston side (the "upper side" in FIG. 2) of the compression-side main valve 53 and between the compression-side main valve 53 and the compression-side pilot case 52.

The compression-side valve mechanism 51 includes an annular seat portion 211 (the first seat portion). The seat portion 211 is formed on the outer peripheral side of the upper end surface of the piston 3, and the compression-side main valve 53 is in abutment with the seat portion 211 in a seatable and separable manner. The seat portion 211 is formed on the outer peripheral side with respect to the opening of the compression-side passage 20. The compression-side back-pressure chamber 55 is formed between the compression-side pilot case 52 and the back surface of the compression-side main valve 53. The pressure in the compression-side back-pressure chamber 55 is applied to the compression-side main valve 53 in a valve-closing direction. An annular packing 61 made of an elastic member is baked to the compression-side main valve 53. The compression-side main valve 53 is a packing valve in which the packing 61 is in contact with the inner peripheral surface of the cylindrical portion 56 of the compression-side pilot case 52 along the entire circumference thereof.

The compression-side back-pressure chamber 55 is in communication with the cylinder upper chamber 2A via passages 62 formed in the bottom portion 57 of the compression-side pilot case 52 and a sub valve 60. The sub valve 60 is opened when the pressure in the compression-side back-pressure chamber 55 reaches a predetermined pressure, and applies a resistance force to a flow of the hydraulic fluid directed from the compression-side back-pressure chamber 55 to the cylinder upper chamber 2A.

The compression-side back-pressure chamber 55 is in communication with first pressure-receiving chambers 182 formed between the compression-side pilot case 52 and the sub valve 60 via the passages 62. The first pressure-receiving chambers 182 are each defined in a fan-like form by a plurality of first seat portions 183 provided on the upper end surface of the compression-side pilot case 52 (the surface thereof opposite from the compression-side main valve 53 side). The passages 62 are opened on the inner sides with respect to the plurality of first seat portions 183, respectively.

A back-pressure introduction passage 181 is provided in the compression-side pilot case 52. In the back-pressure introduction passage 181, a flow of the hydraulic fluid from the cylinder upper chamber 2A to the compression-side back-pressure chamber 55 is generated due to a movement of the piston 3 in an extension direction. An annular seat portion 65 is provided on the lower end surface of the compression-side pilot case 52 (the surface thereof on the compression-side main valve 53 side). The seat portion 65 defines an annular pressure-receiving chamber 184 provided on the outer periphery of the inner peripheral portion of the bottom portion 57.

A second pressure-receiving chamber 187 isolated from the first pressure-receiving chambers 182 is provided on the upper end surface of the compression-side pilot case 52. The back-pressure introduction passage 181 is opened to the second pressure-receiving chamber 187. The second pressure-receiving chamber 187 is defined by a second seat portion 188. The second seat portion 188 extends in a circular arc form between a pair of adjacent first pressure-receiving chambers 182. A first orifice 185 is provided on the second seat portion 188. The first orifice 185 establishes communication between the second pressure-receiving chamber 187 and the cylinder upper chamber 2A.

Due to this configuration, a compression-side communication passage (a communication passage) establishing communication between the cylinder upper chamber 2A and the compression-side back-pressure chamber 55 is formed in the compression-side valve mechanism 51. Through the compression-side communication passage, the hydraulic fluid in the cylinder upper chamber 2A is introduced into the compression-side back-pressure chamber 55 via the first orifice 185, the second pressure-receiving chamber 187, the back-pressure introduction passage 181, the pressure-receiving chamber 184, and a check valve 63 according to the movement of the piston 3 in the extension direction.

The valve members constituting the extension-side valve mechanism 21 and the compression-side valve mechanism 51 are pressed between the head portion 7 of the piston bolt 5 and a washer 79 and an axial force is generated thereon by tightening a nut 78 attached to a threaded portion (not labeled) of the shaft portion 6 of the piston bolt 5.

As illustrated in FIG. 2, a common passage 11 is formed in the piston bolt 5. The common passage 11 includes an axial passage 12 formed inside a sleeve 15 (an axial hole). The upper end of the sleeve 15 is fittedly attached in a hole 16 opened on the head portion 7 of the piston bolt 5. The common passage 11 includes an axial passage 13 formed at the lower portion of the hole 16 (a portion on the lower side with respect to the lower end of the sleeve 15). The common passage 11 includes an axial passage 14 constituted by a small-diameter hole opened to the hole 16 at the upper end thereof. The inner diameter of the common passage 11 is maximized at the axial passage 13, and is reducing in an order of the axial passage 12 and the axial passage 14. The axial passage 12 is opened on an end surface 9 of the head portion 7 of the piston bolt 5.

The extension-side back-pressure chamber 25 is in communication with a radial passage 34 formed in the shaft portion 6 of the piston bolt 5 via an orifice (not labeled) provided on the seat portion 35 of the extension-side pilot case 22 and the pressure-receiving chamber 174. The radial passage 34 is in communication with the axial passage 14. The axial passage 14 is in communication with a radial passage 39 formed in the shaft portion 6 of the piston bolt 5.

The radial passage 39 is in communication with the extension-side passage 19 via an annular passage 41 formed at the lower end portion of the axial hole 4 of the piston 3, a plurality of cutouts 42 formed on the inner peripheral portion of the piston 3, and a disk valve 40 provided on the piston 3. The disk valve 40 is in abutment with an annular seat portion 43 in a seatable and separable manner. The seat portion 43 is provided on the inner peripheral side of the piston 3 with respect to the seat portion 201 and the opening of the extension-side passage 19. The disk valve 40 is a check valve that permits a flow of the hydraulic fluid from the radial passage 39 to the extension-side passage 19.

The compression-side back-pressure chamber 55 is in communication with a radial passage 64 formed in the shaft portion 6 of the piston bolt 5 via an orifice (not labeled) provided on the seat portion 65 of the compression-side pilot case 52, the pressure-receiving chamber 184, an annular passage 68 formed on the inner peripheral portion of the bottom portion 57 of the compression-side pilot case 52, and a width-across-flats portion 77 formed on the shaft portion 6 of the piston bolt 5. The radial passage 64 is in communication with the axial passage 12 via a hole 66 formed on the side wall of the sleeve 15.

The radial passage 64 is in communication with the compression-side passage 20 via the width-across-flats portion 77, an annular passage 71 formed at the upper end portion of the axial hole 4 of the piston 3, a plurality of cutouts 72 formed on the inner peripheral portion of the piston 3, and a disk valve 70 provided on the piston 3. The disk valve 70 is in abutment with an annular seat portion 73 in a seatable and separable manner. The seat portion 73 is provided on the inner peripheral side of the piston 3 with respect to the seat portion 211 and the opening of the compression-side passage 20. The disk valve 70 is a check valve that permits a flow of the hydraulic fluid from the radial passage 64 to the compression-side passage 20.

A flow of the hydraulic fluid in the common passage 11 is controlled by a pilot valve 81 (a pilot control valve). The pilot valve 81 includes a valve spool 82 and a seat portion 83. The valve spool 82 is slidably provided in the common passage 11. The seat portion 83 is formed on the circumferential edge of the opening of the axial passage 14 at the bottom portion of the hole 16. The valve spool 82 is made of a solid shaft, and includes a slidable portion 84 and a valve body 85. The slidable portion 84 is inserted in the sleeve 15. The valve body 85 is in abutment with the seat portion 83 in a seatable and separable manner.

A head portion 87 of the valve spool 82 is formed at the upper end of the slidable portion 84. A first chamber 130 is formed on the outer periphery of the head portion 87 of the valve spool 82. A spring bearing 88 shaped like an outer flange is formed at the lower end portion of the head portion 87. The inner peripheral portion of a spring disk 113 is connected to the spring bearing 88. The spring disk 113 biases the valve body 85 in a valve-opening direction. Due to this configuration, the head portion 87 of the valve spool 82 is in abutment with (is pressed against) a lower end surface 93 of an actuation rod 92 of the solenoid 90.

A bottomed cylindrical cap 121, which is opened on the upper end side thereof, is attached to the lower portion of the outer peripheral surface of the head portion 7 of the piston bolt 5. An annular seal member 128 seals between the cap 121 and the head portion 7 of the piston bolt 5. Due to that, an annular second chamber 131 is formed between the cap 121 and the head portion 7 of the piston bolt 5. An insertion hole 123 is provided on the cap 121. The shaft portion 6 of the piston bolt 5 is inserted through the insertion hole 123. A plurality of cutouts 124 ("two" cutouts 124 are illustrated in FIG. 2) is provided on the outer periphery of the insertion hole 123. The cutouts 124 are in communication with the width-across-flats portion 77 formed on the shaft portion 6.

A spool back-pressure relief valve 107, a spacer 108, and a retainer 132 are provided between the cap 121 and the head portion 7 of the piston bolt 5 in this order starting from the head portion 7 side. The spool back-pressure relief valve 107, the spacer 108, and the retainer 132 are provided in the second chamber 131. The spool back-pressure relief valve 107 is a check valve that permits a flow of the hydraulic fluid from the first chamber 130 to the second chamber 131 via a passage 29 formed in the head portion 7. The edge portion of the outer periphery of the spool back-pressure relief valve 107 is in abutment with an annular seat portion 109 in a seatable and separable manner. The seat portion 109 is formed on the head portion 7 of the piston bolt 5. A plurality of cutouts 133 is provided on the edge portion of the inner periphery of the retainer 132. The plurality of cutouts 133 establishes communication of the second chamber 131 with the width-across-flats portion 77 and the cutouts 124 of the cap 121. A retainer 59 is interposed between the cap 121 and the sub valve 60. The retainer 59 defines a maximum valve-opening amount of the sub valve 60.

A fail-safe valve 111 is constructed in the first chamber 130. The fail-safe valve 111 includes a disk 112 (a valve seat). The spring bearing 88 (a valve body) of the head portion 87 of the valve spool 82 is in abutment with the disk 112 in a seatable and separable manner. The edge portions of the outer peripheries of the disk 112 and the spring disk 113 are held between the head portion 7 of the piston bolt 5 and a core 99 of the solenoid 90.

The valve body 85 of the valve spool 82 is formed into a circular shape having cutouts 86 (only one of them is illustrated in FIG. 2) constituting a width across flats in cross-section along a plane perpendicular to the axis. Then, when a control current to a coil 95 is 0 A (at the time of a failure), the valve spool 82 is moved in a direction for opening the pilot valve 81 (the upward direction in FIG. 2), and the valve body 85 is fitted in the axial passage 12. As a result, a pair of orifices 114 (only one of them is illustrated in FIG. 2) establishing communication between the axial passages 12 and 13 is formed between the valve body 85 and the axial passage 12. Only one surface of the pair of surfaces constituting the width across flats (the cutouts 86) may be formed. In this case, only one orifice 114 is formed.

On the other hand, when power is applied to the coil 95, the valve body 85 of the valve spool 82 is seated on the seat portion 83, and the pilot valve 81 is closed. In this state in which the pilot valve 81 is closed, in the valve spool 82, the valve body 85 receives a pressure on the axial passage 14 side over a circular pressure-receiving surface having an area equal to the opening area of the axial passage 14, while the slidable portion 84 receives a pressure on the axial passage 12 side over an annular pressure-receiving surface having an area equal to an area calculated by subtracting the cross-sectional area of a neck portion (not labeled) of the valve body 85 from the cross-sectional area of the slidable portion 84. Now, the valve-opening pressure of the pilot valve 81 can be adjusted by controlling the power supply to the coil 95. At the time of a soft mode in which power is supplied to the coil 95 with a low current value, the biasing force of the spring disk 113 and the thrust force generated by a plunger 96 are balanced, and the valve body 85 is kept in a state of being separated from the seat portion 83 by a predetermined distance.

Figure 4:
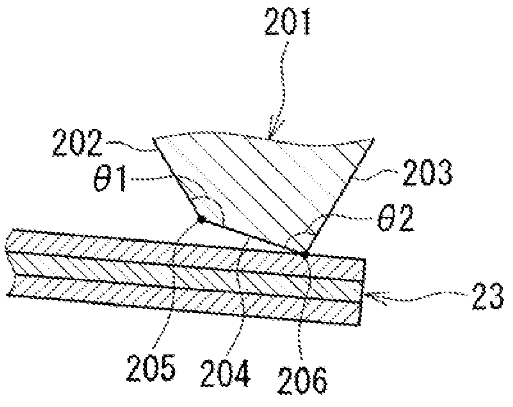
FIG. 4 illustrates a second embodiment.

The solenoid 90 includes a solenoid mechanism portion 91, a yoke 94, and the coil 95 (an armature coil). As illustrated in FIG. 4, the solenoid mechanism portion 91 includes the actuation rod 92, the plunger 96 (an armature) fixed to the outer periphery of the actuation rod 92, and the vertically divided cores 98 and 99. The cores 98 and 99 are held coaxially at a predetermined vertical interval using vertically divided holders 104 and 105. The actuation rod 92 is guided vertically (axially) by a bush 100 attached in a core cover member 106 and a bush 110 attached to the core 99. Further, a rod inner passage 97 is formed inside the actuation rod 92.

A seal member 116 seals between the lower end portion of the bottomed cylindrical yoke 94 and the core 99. Due to this configuration, an annular passage 117 is formed among the piston bolt 5, the yoke 94, and the core 99. The annular passage 117 is in communication with the cylinder upper chamber 2A via a passage 118 provided in the cylindrical portion 8 of the piston bolt 5. A spool back-pressure chamber 101 is formed inside the core 99 of the solenoid 90. The spool back-pressure chamber 101 is in communication with a rod back-pressure chamber 103 via a cutout (not labeled) of the actuation rod 92 and the rod inner passage 97.

The lower end portion of the piston rod 141 is coupled with the upper end portion of the yoke 94. In other words, the lower end (one end) of the piston rod 141 is coupled with the piston 3 via the yoke 94 and the piston bolt 5. A fastening force (an axial force) between the yoke 94 and the piston rod 141 is generated by tightening a nut 137 to axially press a ring member 145 attached in an annular groove 146 on the outer periphery of the piston rod 141. A bump stopper 140 attached to the piston rod 141 is placed in abutment with the upper end surface of the nut 137.

As illustrated in FIG. 1, the piston rod 141 is inserted through a rod guide 135 and an oil seal 134 attached to the opening portions of the cylinder 2 and the outer tube 10 on the upper end sides. As illustrated in FIG. 1, a cover 136 is attached to the outer periphery of the piston rod 141. The cover 136 covers the upper end side of the outer tube 10. As illustrated in FIG. 2, a seal member 139 seals between the piston rod 141 and the yoke 94. The seal member 139 is attached in an annular groove 138 formed on the outer peripheral surface of the lower end portion of the piston rod 141.

As illustrated in FIGS. 1 and 2, the piston rod 141 is made of a hollow shaft in which a hollow portion 142 (an axial hole) extending along the axis is formed. A cable 151 is inserted through the hollow portion 142 of the piston rod 141. Electric wires 153 and 154 of the cable 151 on a protrusion side thereof from a lower end surface 143 (one end) of the piston rod 141 (the piston 3 side) are connected to terminals 161 and 162 of the solenoid 90, respectively.

The terminal 161 is connected to a positive terminal of the coil 95, and the terminal 162 is connected to a negative terminal of the coil 95. Further, the electric wires 153 and 154 of the cable 151 on a protrusion side thereof from an upper end surface 144 (one end) of the piston rod 141 are connected to a connector 157 of the vehicle side (a power supply apparatus side).

Next, a flow of the hydraulic oil in the above-described shock absorber 1 will be described. During the extension stroke, the hydraulic fluid in the cylinder upper chamber 2A is introduced into the extension-side back-pressure chamber 25 via an upstream-side back-pressure introduction passage, i.e., the extension-side passage 19, an orifice (not labeled) formed on the disk valve 40, the cutouts 42 formed on the piston 3, the annular passage 41 formed in the axial hole 4 of the piston 3, the radial passage 34, the axial passage 14, the radial passage 39, the annular passage 38 formed in the extension-side pilot case 22, and the check valve 33.

Further, during the extension stroke, the hydraulic fluid in the cylinder upper chamber 2A (a chamber on an upstream side) is introduced into the compression-side back-pressure chamber 55 via the compression-side communication passage, i.e., the first orifice 185, the second pressure-receiving chamber 187, the back-pressure introduction passage 181, and the check valve 63. As a result, the compression-side main valve 53 is prevented from being opened under the pressure in the cylinder upper chamber 2A during the extension stroke.

The hydraulic fluid introduced into the compression-side back-pressure chamber 55 during the extension stroke flows to the cylinder lower chamber 2B (a chamber on a downstream side) via the orifice (not labeled) formed on the seat portion 65, the pressure-receiving chamber 184, the annular passage 68 formed on the inner peripheral portion of the bottom portion 57 of the compression-side pilot case 52, the width-across-flats portion 77 formed on the shaft portion 6 of the piston bolt 5, the cutouts 72 formed on the inner peripheral portion of the piston 3, the disk valve 70, and the compression-side passage 20, and therefore a damping force according to an orifice characteristic due to the orifice 67 and a valve characteristic due to the disk 70 can be acquired before the extension-side main valve 23 is opened, i.e., in a region where the piston speed is a low speed.

On the other hand, during the compression stroke, the hydraulic fluid in the cylinder lower chamber 2B (the chamber on the upstream side) is introduced into the compression-side back-pressure chamber 55 via an upstream-side back-pressure introduction passage, i.e., the compression-side passage 20, an orifice (not labeled) formed on the disk valve 70, the cutouts 72 formed on the piston 3, the annular passage 71 formed in the axial hole 4 of the piston 3, the width-across-flats portion 77 formed on the shaft portion 6 of the piston bolt 5, the annular passage 68 formed in the compression-side pilot case 52, and the check valve 63.

Further, during the compression stroke, the hydraulic fluid in the cylinder lower chamber 2B (the chamber on the upstream side) is introduced into the extension-side back-pressure chamber 25 via the extension-side communication passage, i.e., the first orifice 175, the second pressure-receiving chamber 177, the back-pressure introduction passage 171 (a downstream-side back-pressure introduction passage), and the check valve 33. As a result, the extension-side main valve 23 can be prevented from being opened under the pressure in the cylinder lower chamber 2B during the compression stroke.

The hydraulic fluid introduced into the extension-side back-pressure chamber 25 during the compression stroke flows to the cylinder upper chamber 2A (the chamber on the downstream side) via the orifice (not labeled) formed on the seat portion 35, the pressure-receiving chamber 174, the annular passage 38 formed on the inner peripheral portion of the bottom portion 27 of the extension-side pilot case 22, the radial passage 39, the axial passage 14, the radial passage 34, the annular passage 41 formed in the axial hole 4 of the piston 3, the cutouts 42 formed on the inner peripheral portion of the piston 3, the disk valve 40, and the extension-side passage 19, and therefore a damping force according to an orifice characteristic due to the orifice (not labeled) provided on the seat portion 35 and a valve characteristic due to the disk 40 can be acquired before the compression-side main valve 53 is opened, i.e., in the region where the piston speed is a low speed.

Figure 3:
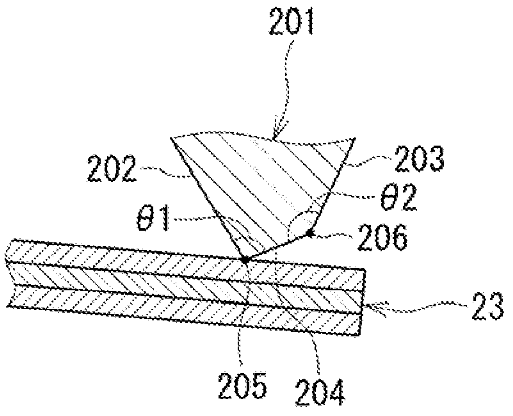
FIG. 3 is an enlarged view of an abutment portion between an extension-side main valve (a valve member) and a seat portion (a first seat portion) illustrated in FIG. 2.

Next, the main portions of the first embodiment will be described with reference to FIG. 3. FIG. 3 is an enlarged view of the abutment portion between the extension-side main valve 23 (the valve member) and the seat portion 201 (the first seat portion) illustrated in FIG. 2. The abutment portion between the compression-side main valve 53 (the valve member) and the seat portion 211 (the first seat portion) is structured similarly to the abutment portion between the extension-side main valve 23 and the seat portion 201. Therefore, the present embodiment will be described, illustrating only the abutment portion between the extension-side main valve 23 (hereinafter referred to as the "main valve 23") and the seat portion 201 and omitting the illustration of the abutment portion between the compression-side main valve 53 and the seat portion 211, with the aim of simplifying the description of the specification.

The seat portion 201 includes an annular first surface 202 provided on the inner peripheral side (the "left side" in FIG. 3) of the seat portion 201, an annular second surface 203 provided on the outer peripheral side (the "right side" in FIG. 3) of the seat portion 201, and an annular third surface 204 provided between the first surface 202 and the third surface 203. The first surface 202, the second surface 203, and the third surface 204 are linear in cross-section along the axial plane of the piston 3. The first surface 202 and the second surface 203 are formed so as to be tapered (narrowed in radial width) in a direction away from the piston 3 (the "downward direction" in FIG. 3). The angle defined between the first surface 202 and the second surface 203 is an acute angle.

An annular ridge portion 205 (a second protrusion portion) is formed between the first surface 202 and the third surface 204. Further, an annular ridge portion 206 (a first protrusion portion) is formed between the second surface 203 and the third surface 204. An angle θ2 defined between the second surface 203 and the third surface 204, i.e., an angle θ2 of the ridge portion 206 is an obtuse angle, and is larger than an angle θ1 defined between the first surface 202 and the third surface 204. i.e., an angle θ1 of the ridge portion 205 (θ2>θ1). Accordingly, the ridge portion 205 extends (protrudes) in the direction away from the piston 3 (the "downward direction" in FIG. 3) further than the ridge portion 206. As a result, the main valve 23 (the valve member) is placed in abutment with only the ridge portion 205 (the second protrusion portion) on the inner peripheral side of the seat portion 201 (the first seat portion) in a state of being mounted on the piston 3 (refer to FIG. 2).

Then, in the conventional shock absorber, the valve member is placed in abutment with such a seat surface that the distal end of the first seat portion is taken along a plane in parallel with the plane perpendicular to the axis of a piston, and therefore is abuttable with the seat surface of the first seat portion over an entire surface in the width direction (an entire surface in the radial direction). Accordingly, the conventional shock absorber may be prone to a variation in the seat diameter on which the valve member is seated (the contact diameter of the first seat portion) due to a dimensional error of the step height of the seat surface of the first seat portion, thus making the pressure-receiving surface of the valve member variable and leading to variations in the valve-opening point and the damping force.

On the other hand, the first embodiment is configured in such a manner that the annular ridge portion 205 (the second protrusion portion) is formed between the first surface 202 on the inner peripheral side of the seat portion 201 (the first seat portion) and the adjacent third surface 204 and the annular ridge portion 206 (the first protrusion portion) is also formed between the second surface 203 on the outer peripheral side of the seat portion 201 and the adjacent third surface 204, and the main valve 23 (the valve member) is in abutment with only the ridge portion 205 on the inner peripheral side of the seat portion 201 in the state of being mounted on the piston 3.

As a result, the first embodiment can maximally reduce the contact area between the main valve 23 (the valve member) and the seat portion 201 (the first seat portion) (narrow the radial contact width). Therefore, the first embodiment allows the contact diameter between the main valve 23 and the seat portion 201 (the ridge portion 205) to be kept constant by managing the radial dimension of the ridge portion 205 (the second protrusion portion) on the inner peripheral side of the seat portion 201, thereby contributing to preventing or reducing variations in the valve-opening point and the damping force.

(Second Embodiment) Next, a second embodiment will be described with reference to FIG. 4.

The second embodiment will be described, assigning the same names and reference numerals to portions shared with the first embodiment, and omitting redundant descriptions thereof.

The above-described first embodiment is configured in such a manner that the main valve 23 is in abutment with only the ridge portion 205 on the inner peripheral side of the seat portion 201 in the state of being mounted on the piston 3. On the other hand, the second embodiment is configured in such a manner that the main valve 23 (the valve member) is in abutment with only the ridge portion 206 (the second protrusion portion) on the outer peripheral side of the seat portion 201 (the first seat portion) in the state of being mounted on the piston 3.

As illustrated in FIG. 4, in the second embodiment, the angle θ1 defined between the first surface 202 and the third surface 204, i.e., the angle θ1 of the ridge portion 205 (the first protrusion portion) is an obtuse angle, and is larger than the angle θ2 defined between the second surface 203 and the third surface 204, i.e., the angle θ2 of the ridge portion 206 (the second protrusion portion) (θ1>θ2). Accordingly, the ridge portion 206 extends (protrudes) in the direction away from the piston 3 (the "downward direction" in FIG. 4) further than the ridge portion 205. As a result, the main valve 23 (the valve member) is placed in abutment with only the ridge portion 206 on the outer peripheral side of the seat portion 201 (the first seat portion) in the state of being mounted on the piston 3 (refer to FIG. 2).

According to the second embodiment, advantageous effects equivalent to the above-described first embodiment can be achieved.

Further, the second embodiment can increase the seat diameter on which the main valve 23 (the valve member) is seated (the contact diameter of the first seat portion 201) compared to the first embodiment in which the seat portion 201 is taller on the inner peripheral side. As a result, the second embodiment leads to an increase in the pressure-receiving area of the main valve 23 and thus a reduction in the valve-opening point of the soft-side damping force characteristic, thereby being able to improve the ride comfort of the vehicle.

The embodiments are not limited to the above-described examples, and, for example, can be configured in the following manner.

The first and second embodiments have been described citing the application thereof to the shock absorber 1 including the damping force variable mechanism 17 that forms the back-pressure chambers 25 and 55 by the abutment of the annular packings 31 and 61 baked to the main valves 23 and 53 (the valve member) against the inner peripheral surfaces of the pilot cases 22 and 52, respectively, but the configurations according to the first and second embodiments can also be applied to, for example, a shock absorber including a damping force variable mechanism that includes a spool member axially movable in sliding contact with the inner peripheral surface of a pilot case and forms a back-pressure chamber by abutment of an annular seal member formed on the spool member against a disk valve.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2021-055341 filed on Mar. 29, 2021. The entire disclosure of Japanese Patent Application No. 2021-055341 filed on Mar. 29, 2021 including the specification, the claims, the drawings, and the abstract is incorporated herein by reference in its entirety.

REFERENCE SIGNS LIST

1 shock absorber
2 cylinder
2A cylinder upper chamber (first chamber)
2B cylinder lower chamber (second chamber)
3 piston
23 extension-side main valve (valve member)
53 compression-side main valve (valve member)

201 seat portion (first seat portion)
205 ridge portion (second protrusion portion)
206 ridge portion (first protrusion portion)

The invention claimed is:

1. A shock absorber comprising:
a cylinder sealingly containing hydraulic fluid therein;
a piston partitioning an inside of the cylinder into a first chamber and a second chamber; and
a valve member configured to open and close a passage provided in the piston,
wherein an annular first seat portion protruding from the piston is formed on the piston on an outer peripheral side with respect to an opening of the passage,
wherein an annular first protrusion portion and an annular second protrusion portion are formed on the first seat portion, the second protrusion portion extending in a direction away from the piston further than the first protrusion portion,
wherein the valve member is placed in abutment with only the second protrusion portion in a state of being mounted on the piston,
wherein the first seat portion includes an annular first surface provided on an inner peripheral side of the first seat portion, an annular second surface provided on an outer peripheral side of the first seat portion, and an annular third surface provided between the first surface and the second surface,
wherein the first surface, the second surface and the third surface are each formed linearly in cross-section along an axial plane of the piston,
wherein the first surface and the second surface are formed so as to taper in the direction away from the piston,
wherein each of the first protrusion portion and the second protrusion portion is an annular ridge portion formed between two adjacent surfaces among the first surface, the second surface and the third surface,
wherein the annular ridge portion constituting the second protrusion portion protrudes in the direction away from the piston farther than the annular ridge portion constituting the first protrusion portion, and
wherein the valve member is placed in abutment with only the annular ridge portion constituting the second protrusion portion.

2. The shock absorber according to claim 1, wherein the valve member has a first side that faces the piston and an opposite second side which faces away from the piston, and wherein a pilot chamber is provided on the second side of the valve member, the pilot chamber being configured to apply a back-pressure to the valve member.

3. The shock absorber according to claim 2, wherein the valve member is a disk valve with a packing baked thereto.

4. The shock absorber according to claim 2, wherein the valve member includes a disk valve, an axially movable spool member, and a seal member provided between the disk valve and the spool member.

5. The shock absorber according to claim 1, wherein the valve member is a disk valve with a packing baked thereto.

6. The shock absorber according to claim 1, wherein the valve member includes a disk valve, an axially movable spool member, and a seal member provided between the disk valve and the spool member.

7. A valve apparatus comprising:
a piston partitioning an inside of a cylinder into a first chamber and a second chamber; and
a valve member configured to open and close a passage provided in the piston,
wherein an annular first seat portion protruding from the piston is formed on the piston on an outer peripheral side with respect to an opening of the passage,
wherein an annular first protrusion portion and an annular second protrusion portion are formed on the first seat portion, the second protrusion portion extending in a direction away from the piston further than the first protrusion portion,
wherein the valve member is placed in abutment with only the second protrusion portion in a state of being mounted on the piston,
wherein the first seat portion includes an annular first surface provided on an inner peripheral side of the first seat portion, an annular second surface provided on an outer peripheral side of the first seat portion, and an annular third surface provided between the first surface and the second surface,
wherein the first surface, the second surface and the third surface are each formed linearly in cross-section along an axial plane of the piston,
wherein the first surface and the second surface are formed so as to taper in the direction away from the piston,
wherein each of the first protrusion portion and the second protrusion portion is an annular ridge portion formed between two adjacent surfaces among the first surface, the second surface and the third surface,
wherein the annular ridge portion constituting the second protrusion portion protrudes in the direction away from the piston farther than the annular ridge portion constituting the first protrusion portion, and
wherein the valve member is placed in abutment with only the annular ridge portion constituting the second protrusion portion.

* * * * *